US012300278B2

(12) United States Patent
Aoki et al.

(10) Patent No.: US 12,300,278 B2
(45) Date of Patent: May 13, 2025

(54) MAGNETIC DISK DEVICE AND WRITE METHOD

(71) Applicants: Kabushiki Kaisha Toshiba, Tokyo (JP); Toshiba Electronic Devices & Storage Corporation, Tokyo (JP)

(72) Inventors: Takao Aoki, Kanagawa (JP); Ryuta Kumagai, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/523,705

(22) Filed: Nov. 29, 2023

(65) Prior Publication Data

US 2025/0061919 A1    Feb. 20, 2025

(30) Foreign Application Priority Data

Aug. 14, 2023    (JP) ................. 2023-131952

(51) Int. Cl.
| G11B 5/012 | (2006.01) |
| G11B 5/02  | (2006.01) |
| G11B 5/55  | (2006.01) |
| G11B 5/596 | (2006.01) |
| G11B 19/04 | (2006.01) |

(52) U.S. Cl.
CPC .............. *G11B 5/02* (2013.01); *G11B 5/5539* (2013.01); *G11B 19/047* (2013.01)

(58) Field of Classification Search
CPC ..... G11B 20/10388; G11B 5/012; G11B 5/54; G11B 5/596; G11B 5/59627; G11B 5/59638; G11B 5/59688; G11B 19/045; G11B 20/18; G11B 5/5534; G11B 5/02; G11B 2020/10898; G11B 5/5539
USPC .......................................... 360/75
See application file for complete search history.

(56) References Cited

U.S. PATENT DOCUMENTS

| 9,377,956 | B1 | 6/2016 | Liu et al. |
| 10,650,845 | B2* | 5/2020 | Ikeshima ........... G11B 20/1816 |
| 10,867,632 | B2* | 12/2020 | Yamamoto ............ G11B 5/012 |
| 11,164,598 | B1 | 11/2021 | Kashyap et al. |
| 2014/0177085 | A1 | 6/2014 | Haga et al. |
| 2017/0249096 | A1* | 8/2017 | Hongawa ............. G06F 3/0679 |

FOREIGN PATENT DOCUMENTS

JP     2014-127029 A    7/2014

\* cited by examiner

*Primary Examiner* — Nabil Z Hindi
(74) *Attorney, Agent, or Firm* — Kim & Stewart LLP

(57) ABSTRACT

According to one embodiment, a magnetic disk device configured to record data in a shingled-recording manner, wherein the device performs sequential write in a shingled-recording area on a magnetic disk such that data to be written in a write target track and data located in a one-forward track of the write target track are received on a volatile memory and then write with respect to the write target track is performed, and upon occurrence of an unexpected power cut, the device stores data unwritten in the shingled-recording area out of the data received on the volatile memory in a nonvolatile memory.

12 Claims, 13 Drawing Sheets

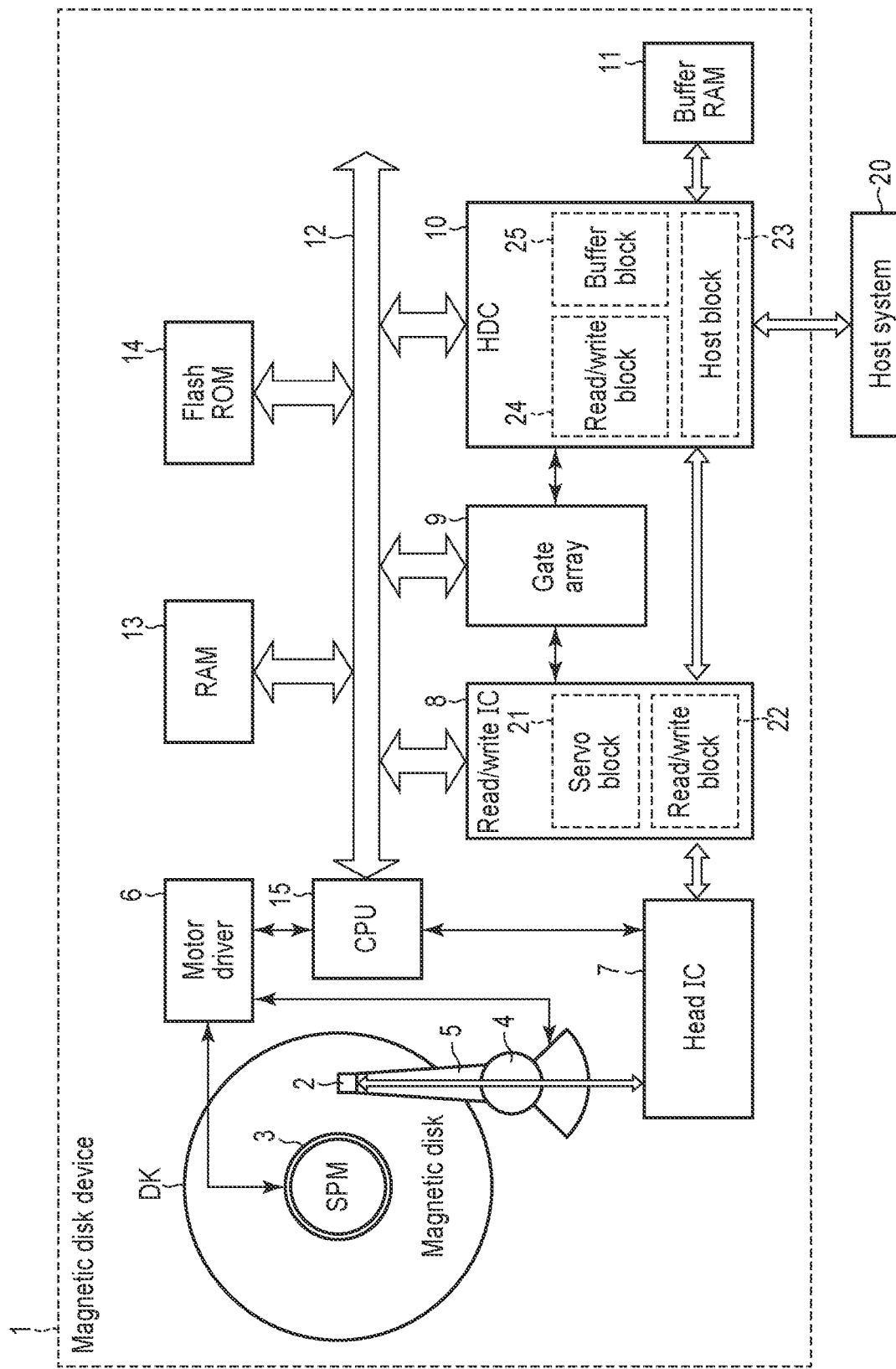
F I G. 1

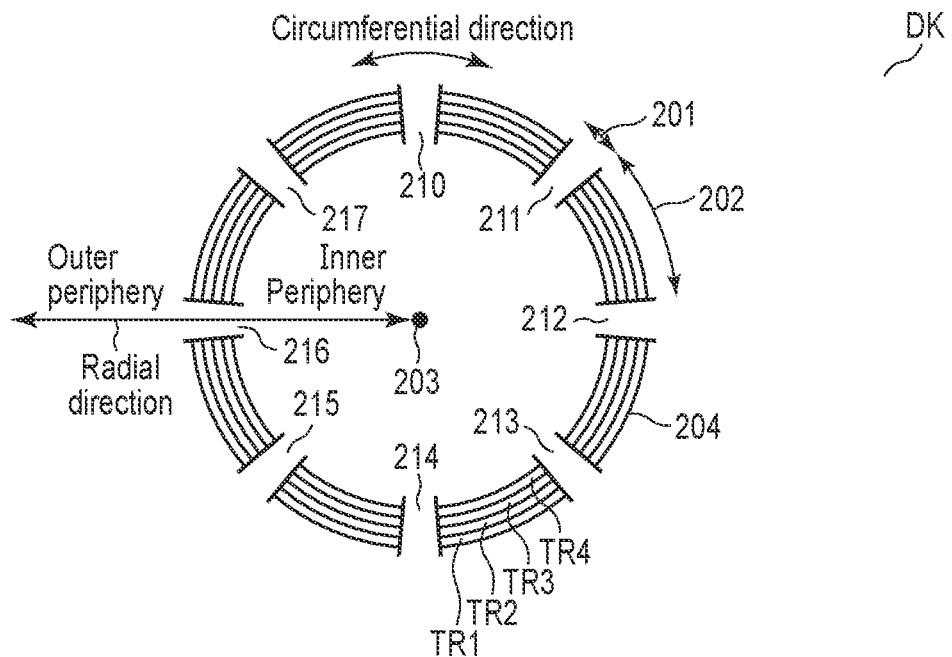
F I G. 2
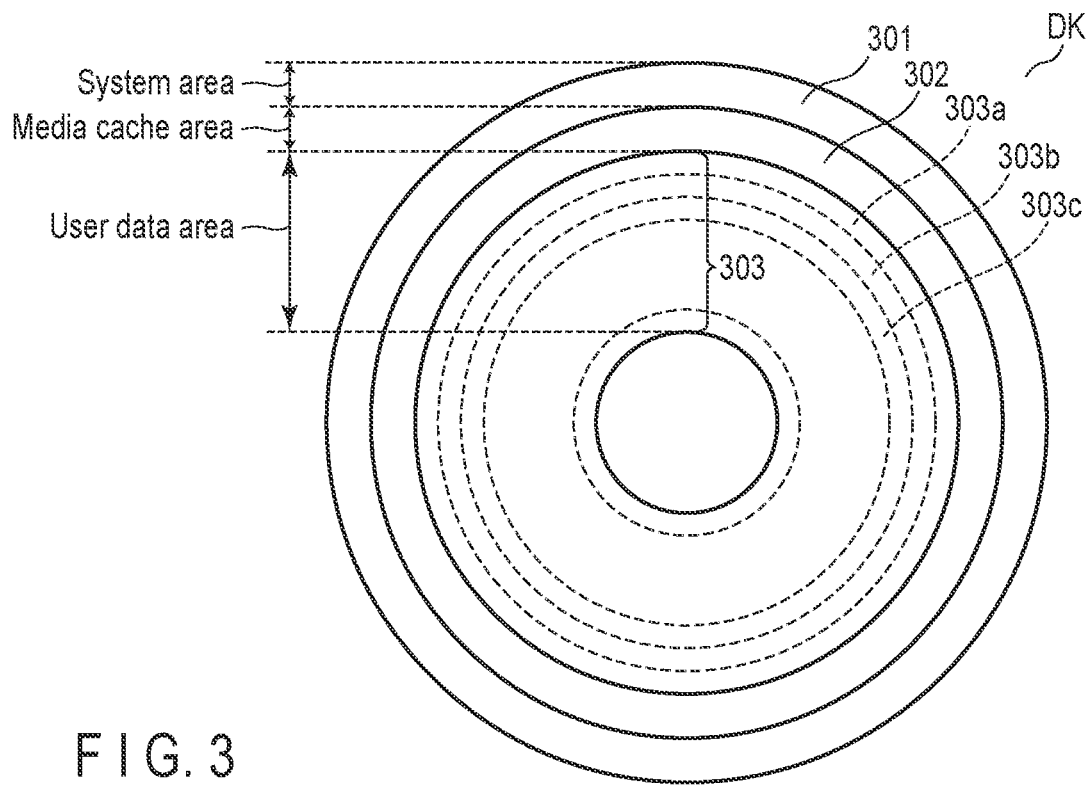
F I G. 3

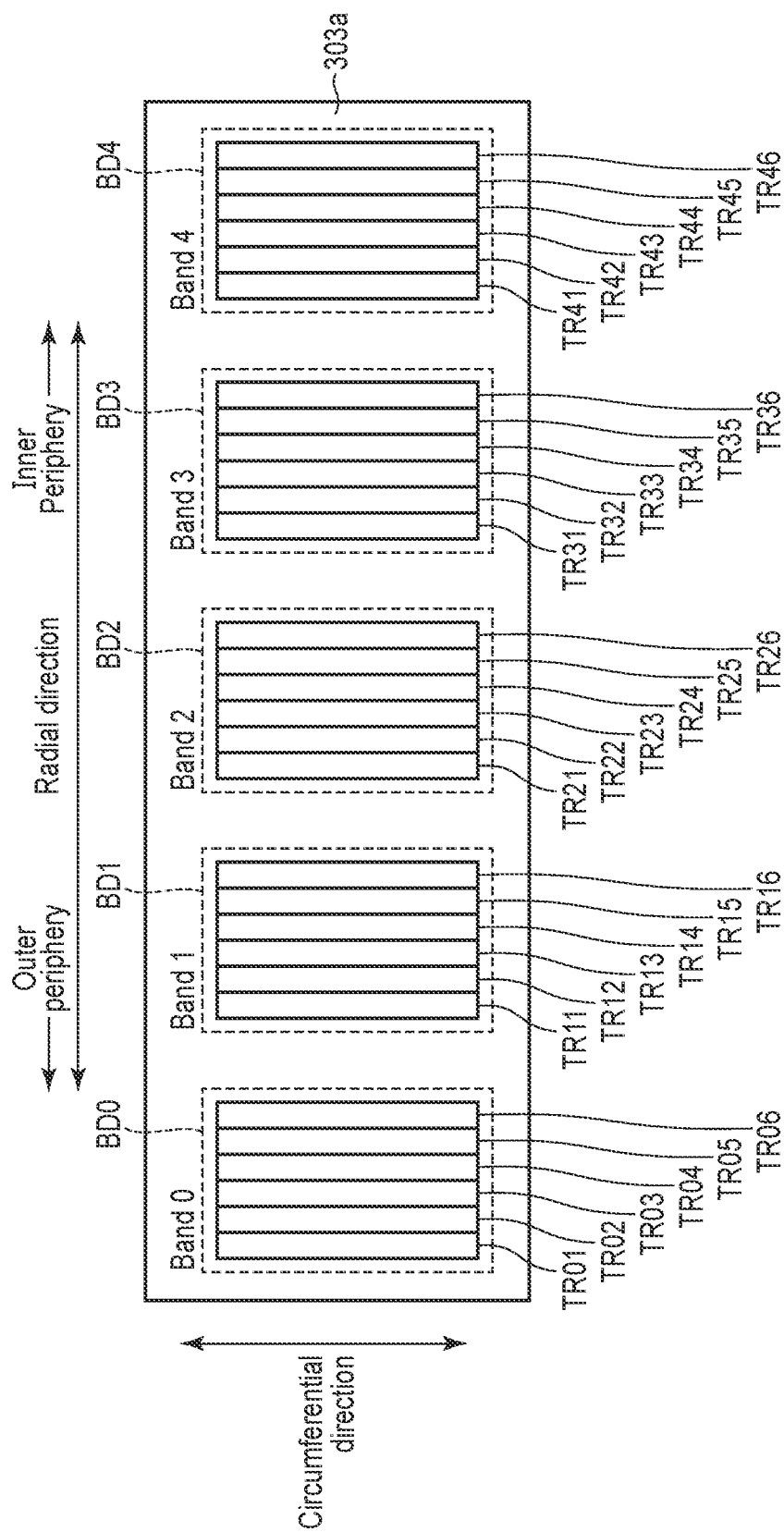
F I G. 5

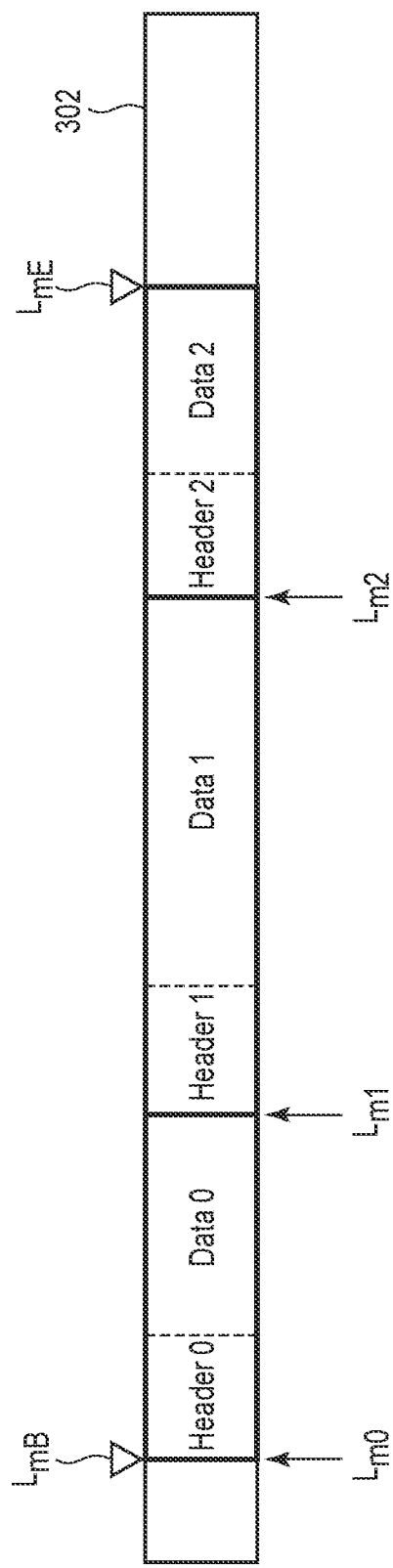
F I G. 6

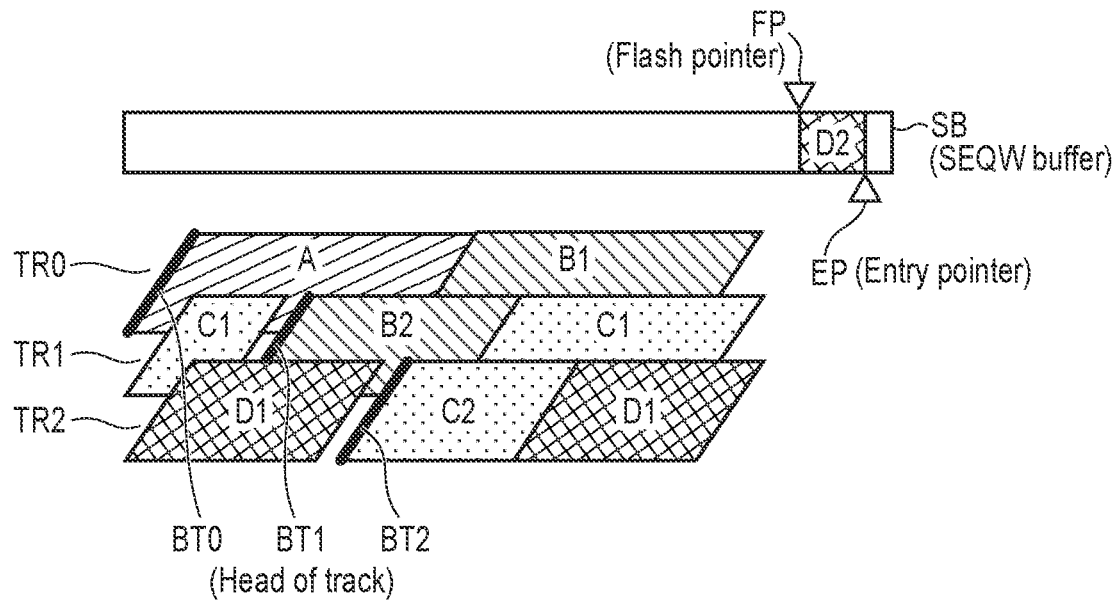
F I G. 9
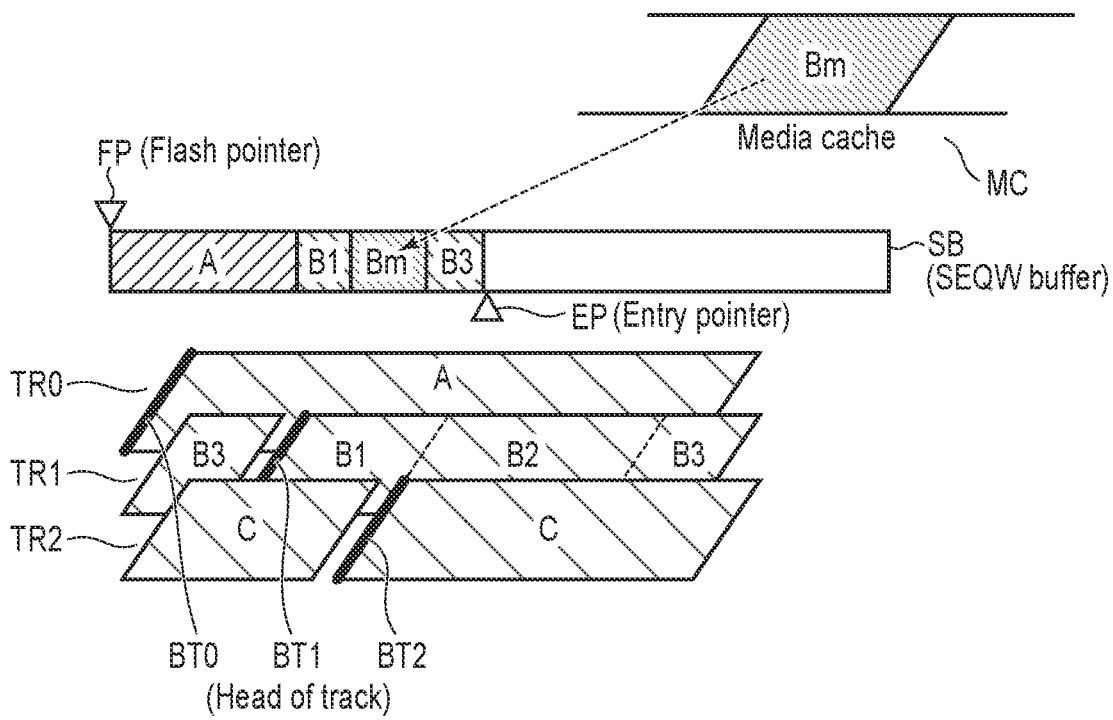
F I G. 10

(a) Bypass write detection table

| Time | NextLBA (NLBA) | Blocks | BP |
|---|---|---|---|
| 20000 | 80600 | 600 | – |
| 35000 | 103300 | 3300 | 1 | ~TDD1
| 5000 | 220500 | 20500 | – |
| 40000 | 305000 | 5000 | 0 | ~TDD0
| 10000 | 500200 | 200 | – |
| ⋮ | ⋮ | ⋮ | ⋮ |

(b) Bypass write execution table

| BP | BeginningBA (BLBA) | EP | FP |
|---|---|---|---|
| 0 | 302000 | 3000 | 2000 | ~TDE0
| 1 | 102500 | 800 | 0 | ~TDE1
| 2 | – | – | – |
| ⋮ | ⋮ | ⋮ | ⋮ |
| n | – | – | – |

F I G. 12

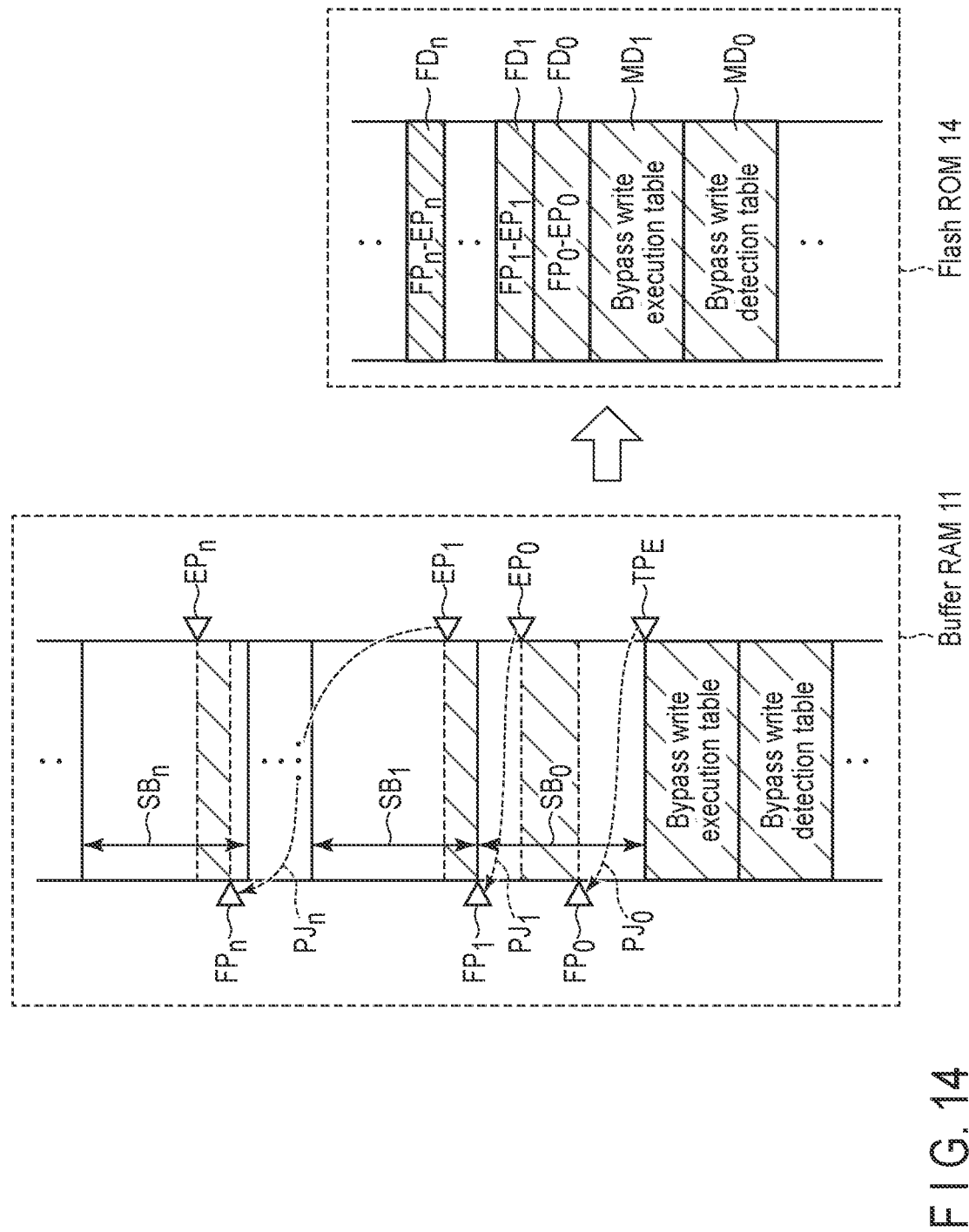
F I G. 14

MAGNETIC DISK DEVICE AND WRITE METHOD

CROSS-REFERENCE TO RELATED APPLICATIONS

This application is based upon and claims the benefit of priority from Japanese Patent Application No. 2023-131952, filed Aug. 14, 2023, the entire contents of which are incorporated herein by reference.

FIELD

Embodiments described herein relate generally to magnetic disk device utilizing a shingled-recording (SMR) technique, and a write method of the same.

BACKGROUND

In drive managed SMR HDDs (hereinafter, referred to as magnetic disk devices), a bypass write method in which sequential write data sent from a host are written directly into a shingled-recording area without passing through a media cache is used.

In the bypass write method, overwrite of data to a write target band (a write unit of a shingled-recording method magnetic disk device) is not performed in order to protect data in case of power cut, but an empty band (a band with existing data therein is emptied by moving the data therein to a different area such as a media cache so that new data can be written therein) is generated in a different position, in order to separately write the data therein.

However, many empty bands are required in execution of multi-streaming writes where writes with respect to multiple data streams are performed in parallel, and thus, writes to a media cache increase.

The present application aims to present a magnetic disk device configured to perform bypass write without using an empty band, and a write method of the same.

BRIEF DESCRIPTION OF THE DRAWINGS

FIG. 1 is a block diagram illustrating a hardware structure of a magnetic disk device of a first embodiment.

FIG. 2 is a schematic view of an arrangement example of tracks and data on a magnetic disk of the first embodiment.

FIG. 3 is a schematic view illustrating an example of an area arrangement on the magnetic disk of the first embodiment.

FIG. 5 is a schematic view illustrating an example of a sub area in a data area on the magnetic disk of the first embodiment.

FIG. 6 is a schematic view illustrating a usage example of a media cache on the magnetic disk of the first embodiment.

FIG. 9 is a third schematic view illustrating an example of the data write process to the magnetic disk in the magnetic disk device of the first embodiment.

FIG. 10 is a fourth schematic view illustrating an example of the data write process to the magnetic disk in the magnetic disk device of the first embodiment.

FIG. 12 illustrates an example of a management table for the bypass write process of the magnetic disk device of the first embodiment.

FIG. 14 is a schematic view illustrating an example of a data protection process by a PLP function of the magnetic disk device of the first embodiment.

DETAILED DESCRIPTION

Figure 4:
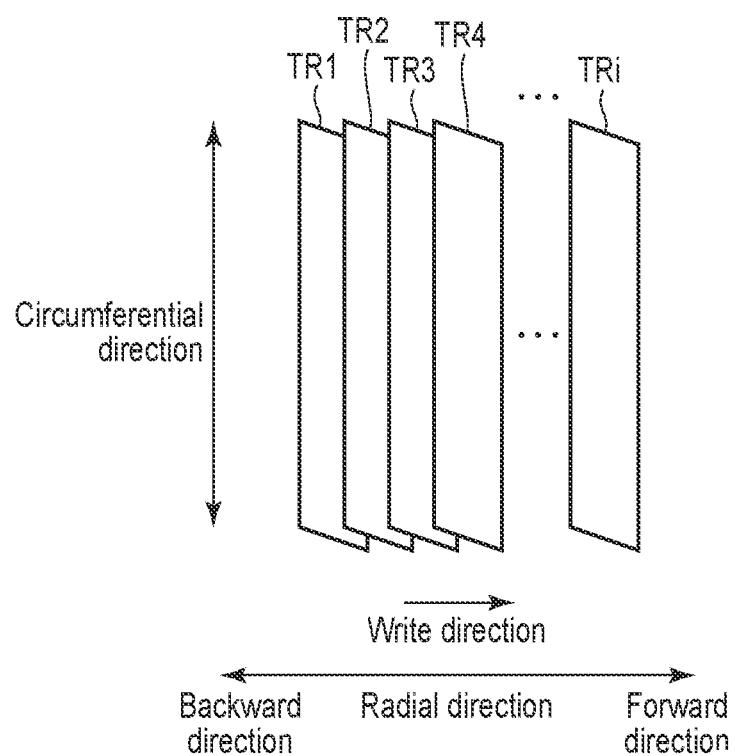
FIG. 4 is a schematic view illustrating an example of overlapping shingled-recording tracks on the magnetic disk of the first embodiment.

Hereinafter, embodiments of the present application will be described in reference to the accompanying drawings.

In general, according to one embodiment, a magnetic disk device configured to record data in a shingled-recording manner, wherein the device performs sequential write in a shingled-recording area on a magnetic disk such that data to be written in a write target track and data located in a one-forward track of the write target track are received on a volatile memory and then write with respect to the write target track is performed, and upon occurrence of an unexpected power cut, the device stores data unwritten in the shingled-recording area out of the data received on the volatile memory in a nonvolatile memory.

First Embodiment

The present embodiment indicates an example of a magnetic disk device using a power loss protection (PLP) function memory in a bypass write process of shingled magnetic recording (SMR). Specifically, when power to the magnetic disk device is cut, unwritten data is backed up with the PLP function.

FIG. 1 is a block diagram illustrating a hardware structure of the magnetic disk device of the first embodiment.

The magnetic disk device 1 is a memory device configured to write/read data to/from a surface of a magnetic disk DK in response to a request from a host system 20. The magnetic disk device 1 is a drive managed SMR magnetic disk device adopting an SMR method which is a recording method to perform overwrite with respect to a part of adjacent tracks. The drive managed SMR is an SMR method in which position of data write to the magnetic disk DK and the like are managed in the magnetic disk device side. Furthermore, the magnetic disk device 1 includes a PLP function which writes a part of the data in a buffer RAM 11 to a flash ROM 14 in a power loss occasion.

The magnetic disk DK is a disk-shaped magnetic-rotational disk memory medium which is fixed to a spindle motor (SPM) 3 and rotates at a predetermined rate driven by the SPM 3. The details will be further explained later.

A magnetic head 2 is fixed to an end of an actuator 5, and the other end of the actuator 5 is fixed to a voice coil motor (VCM) 4. The magnetic head 2 is driven by the VCM 4 to move in an area overlapping the surface of the magnetic disk DK within an arc orbit about the axis of the VCM 4. The magnetic head 2 writes data by outputting a write signal to the magnetic disk DK and reads data from the magnetic disk DK by extracting a read signal therefrom.

The magnetic disk device 1 of FIG. 1 is an example where one magnetic disk DK and one magnetic head 2 are provided therewith, however, it may include multiple magnetic disks DK and magnetic heads 2 (may be referred to as multi-disk). In that case, multiple magnetic disks DK are fixed to the SPM 3 overlapping with each other with certain gaps therebetween, and multiple magnetic heads 2 and actuators 5 are fixed to the VCM 4 overlapping with each other to match the gaps between the magnetic disks. Thus, all the magnetic disks DK rotate at the same time, and all the magnetic heads 2 move at the same time. Note that, the magnetic heads 2 may be disposed on both front and back surfaces of the magnetic disks DK.

The spindle motor (SPM) 3 is a support of the magnetic disk DK and is disposed in the casing of the magnetic disk device 1, for example. The rotation of the spindle motor 3 rotates the magnetic disk DK.

The voice coil motor (VCM) 4 controls operations of the actuator 5 and the like based on current input therein.

The actuator 5 is fixed to the magnetic head 2 at one end, and the other end thereof is fixed to the VCM 4. Note that the actuator 5 of the present embodiment is controlled by the VCM 4 in this example, however, the control of the actuator 5 may not be performed by the voice coil motor.

A motor driver 6 controls the SPM 3 and VCM 4 based on the control signal from the CPU 15.

Furthermore, upon detection of a power loss during the rotation of the SPM 3, the motor driver 6 supplies power by a reverse electromotive force of the SPM 3 which is from the moment of inertia of the magnetic disk DK to each LSI for a certain period. At that time, the CPU 15 performs write of partial data in the buffer RAM 11 to the flash ROM 14 as one of the power loss occasion processes. Such a function is generally referred to as power loss protection (PLP) function.

A head IC 7 is, for example, integrated circuit (IC) which amplifies an analogue signal (read signal) read by the magnetic head 2 to be output to a read/write IC 8 and outputs a write signal received from the read/write IC 8 to the magnetic head 2.

The read/write IC 8 is, for example, an IC which outputs write data to the magnetic disk DK to the head IC 7, and acquires read data from the magnetic disk DK based on the analogue signal received from the head IC 7. The read/write IC 8 is roughly divided into a servo block 21 configured to perform a signal process required mainly for a positioning process of the magnetic head 2 and a read/write block 22 configured to perform a signal process for data read/data write.

A gate array 9 is a hardware such as IC which generates control signals. Note that, the function of the gate array 9 may be executed by software or a combination of hardware and software.

A disk controller (HDC) 10 may include hardware and software, such as IC chip with a computing function as a microprocessor. The disk controller (HDC) 10 is connected to a CPU bus 12 and also to the gate array 9, buffer RAM 11, and read/write IC 8. Furthermore, the HDC 10 is roughly divided into, based on functions, a host block 23 to perform interface control with the host system 20, buffer block 25 to control the buffer RAM, and read/write block 24 connected to the read/write IC 8 and the gate array 9 for read/write processes.

When the magnetic disk device 1 receives a read command from the host system 20 to read data of the magnetic disk DK, an analogue signal is read from the magnetic disk DK by the magnetic head 2 to be output to the head IC 7. The analogue signal amplified by the head IC 7 is separated by the read/write IC 8 into a servo signal and a data signal, and the data signal is decoded by the read/write block 22, and then, is sent to the HDC 10. The HDC 10 processes the received data signal based on various control signals from the gate array 9 to generate data to be transferred to the host system 20 (for example, read data requested by the read command). The data are temporarily stored in the buffer RAM 11 to be transferred to the host system 20.

When the magnetic disk device 1 receives a write command from the host system 20 and writes data to the magnetic disk DK, the write data transferred from the host system 20 to the HDC 10 are temporarily stored in the buffer RAM 11 and are sent from the HDC 10 to the read/write IC 8 based on various control signals. The write data encoded by the read/write IC 8 are written to the magnetic disk DK by the magnetic head 2 via the head IC 7.

The buffer RAM 11 is a volatile memory which loses data therein if a power supply thereto is cut, and temporarily stores write command data and the like from the host system 20. Furthermore, the buffer RAM 11 is partially used as a bypass write process buffer of the magnetic disk device 1.

The CPU bus 12 is a data transference bus, to which a RAM 13 used for one or more variables, flash ROM 14 in which a program to be executed by CPU 15 is stored, read/write IC 8, gate array 9 to generate various control signals, and disk controller (HDC) 10 are each connected.

The flash ROM 14 is rewritable under the control of the CPU 15. Furthermore, the flash ROM 14 includes a specific area used for data evacuation by the PLP function.

The CPU 15 is a central processing unit which controls the SPM 3 and the VCM 4 through a motor driver 6 and also controls various functions of the whole device such as other IC controlling and command processing. Control registers of the read/write IC 8, gate array 9, and HDC 10 are each assigned to the memory space of the CPU 15, and the CPU 15 controls the above by performing read/write from/to the space. Furthermore, the CPU 15 controls start/stop of the SPM 3 and rotation rate maintenance thereof through the motor driver 6, and positioning of the magnetic head 2 is performed in a constant rotation state after the start of the SPM 3.

The host system 20 is, for example, a personal computer main body, and outputs a read command with respect to the magnetic disk device 1 to acquire read data, and outputs write data with a write command.

FIG. 2 is a schematic view illustrating an arrangement example of tracks and data on the magnetic disk of the first embodiment.

The magnetic disk DK rotates about a rotation axis 203 by the SPM 3. A direction in which the magnetic disk rotates (direction orthogonal to the radial direction of DK) will be referred to as circumferential direction. Regarding the radial direction, a direction outward from the rotation axis 203 which is the center of the magnetic disk DK will be referred to as outer periphery, and a direction toward the rotational axis 203 will be referred to as inner periphery.

On the magnetic disk DK, a plurality of tracks 204 are arranged concentrically, and data received from the host system 20 are recorded in parts thereof based on a designated address. In the example depicted, four tracks TR1, TR2, TR3, and TR4 (or may be referred to as tracks TR if specific identification is not necessary), and note that, a plurality of tracks are arranged concentrically about the SPM 12.

On the track 204, areas (servo areas) 201 in which a servo data signal for positioning is recorded, and areas (data areas) 202 for recording data transferred from the host system are arranged alternately at regular intervals. The servo areas are, as in 210 to 217, arranged in the circumferential direction of the magnetic disk DK at regular intervals, and each data area is arranged between the servo areas.

The magnetic head 2 reads an analogue signal from each servo area, and the head IC 7 amplifies the analogue signal, and the read/write IC 8 acquires data from the amplified analogue signal (may be referred to as servo data). The servo areas are, in the magnetic disk DK, arranged in the circumferential direction at regular intervals, and the servo data are also acquired at regular intervals in time.

The read/write IC 8 and the gate array 9 use servo data to generate a signal for positioning of the magnetic head 2 (position control signal). The CPU 15 controls the motor driver 6 based on the position control signal, and supplies current for positioning of the magnetic head 2 to the VCM 4 in real time.

When performing read/write of data to a data area, the magnetic disk device 1 moves a magnetic head 2 over a target track TR by seek control, tracking control, and the like, in order to read a read signal from the magnetic head 2, or to output a write signal to the track TR. If specific identification is necessary, data on the magnetic disk DK will be referred to as disk data, data on the magnetic disk DK to be read will be referred to as read data, and data to be written to the magnetic disk DK will be referred to as write data.

FIG. 3 is a schematic view illustrating an example of an area arrangement on the magnetic disk of the first embodiment.

In the data writable area, a user data area which can be used by a user (host system 20), media cache area in which user data are temporarily stored, and system area in which information required for system management are allocated.

The magnetic disk DK is divided into, from the outer periphery side, a system area 301, media cache (MC) area 302, and user data area 303, and only the user data area 303 is recorded in the SMR method. Note that, in this example depicted, the data area 202 alone is focused, and thus, the servo area 201 is omitted.

In the system area 301, management information including, for example, defect map, MC management table, SMR data management table is recorded.

The MC area 302 is used as a media cache in which data to be written to the user data area 303 are temporarily written. In the SMR method, data for multiple tracks are required to be written at once, and in many cases, update target data of write command received from the host system 20 cannot be exclusively rewritten. Thus, command data are required to be temporarily stored, however, the buffer RAM 11 alone has a limited capacity, and thus, the area on the magnetic disk DK is used for the aforementioned purpose.

The user data area 303 is an area in which the write data from the host system 20 are recorded finally. The area is recorded in the SMR method, and all logical block addresses (LBAs) are assigned to any in the area. Furthermore, the user data area 303 is further divided into a plurality of sub areas (in the example depicted, only three sub areas 303a, 303b, and 303c are shown; however, the number is not limited thereto). In the present embodiment, the sub area corresponds to a constant density recording (CDR) zone.

FIG. 4 is a schematic view illustrating an example of overlapping shingled-recording tracks on the magnetic disk of the first embodiment.

All the tracks on the magnetic disk DK are annular, and in this example, each track is schematically shown as a rectangle along a vertical direction (circumferential direction of the magnetic disk DK). Furthermore, the horizontal direction corresponds to the radial direction of the magnetic disk DK, and the figure shows an example where multiple tracks TRi (i is an integer which is two or more) are arranged. Furthermore, in the figure, a writing direction to the magnetic disk DK (write direction) is from the left side to the right side, and tracks in further left side will be referred to as backward tracks, and tracks in further right side will be referred to as forward tracks.

Since the magnetic disk device 1 adopts the SMR method, recording is performed in a state where a track partially overlaps with adjacent tracks in the data area as in the figure. Thus, write to the tracks is limited to one direction (direction indicated by the arrow), and write to the backward tracks is prohibited (otherwise the data in the forward tracks are destroyed because of the overlapping).

In the SMR method, if data are partially rewritten, all data must be rewritten from the head of the track (the head of TR1 of FIG. 4), and thus, the tracks within the user data area 303 of FIG. 2 (or sub areas 303a, 303b, and 303c) are divided into groups, and gaps are provided with the groups such that write per group is performable. Such a group will be referred to as band (shingled band, SMR band). In the SMR method, write performed to the backward tracks is prohibited, and there is no gap between the tracks, and write within the band is always sequential (one direction with respect to the tracks).

FIG. 5 is a schematic view illustrating an example of a sub area in the data area on the magnetic disk of the first embodiment, and the sub area 303a of FIG. 3 is used as an example, which is a rectangular data area, circumferential direction of which is the vertical direction and diameter direction of which is the horizontal direction (left side is outer periphery and right side is inner periphery).

The sub area 303a is divided into a plurality of bands, and a band is a write unit of the data area. Write to a band will be referred to as band write (shingled-write). Note that, in the figure, the number of bands is five, and band 0 to band 4 are shown for simplification; however, the number is not limited. If the number of bands is small, a write unit becomes greater, and thus, in actuality, more bands are set. Furthermore, the size of the bands (number of blocks) is the same in the same sub area. In the figure, five tracks are arranged in each band; however, the number thereof is not limited thereto.

A certain gap is provided between bands, and thus, for example, write to band 1 which is disposed forward to band 0 does not influence the data of band 0.

Furthermore, LBAs are sequentially allocated from the left side band to the right side band in the figure (for example, band 0, band 1, band 2 . . . ). Thus, the number of blocks assigned to one sub area is calculated as "number of bands within an area x number of blocks per band".

FIG. 6 is a schematic view illustrating an example of use of the media cache on the magnetic disk of the first embodiment, and an example of use of the media cache area 302 of FIG. 3. In this figure, a position in the further right side will be referred to as forward direction, and a position in the further left side will be referred to as backward direction.

With respect to all blocks on the media cache area 302, in-MC LBA which fixedly indicates LBA in MC is assigned, and management is all performed in the in-MC LBA. FIG. 6 describes in the in-MC LBA.

On the MC, the data received from the host system 20 are sequentially recorded in the forward direction, and a header with a head LBA, number of blocks, and the like is added to each data. The header includes attribution information of the data (head LBA, number of blocks, in-MC LBA which will be described later).

In the MC, data with a header are sequentially recorded from the head as in the order of reception of commands, and basically, older one is moved first to the data area (data area 303 of FIG. 3). FIG. 6 illustrates an example where data 0, 1, and 2 by three commands are written in the media cache 302, and data 0, 1, and 2 are associated with headers 0, 1, and 2, respectively, and are stored.

Furthermore, when MC is used to the last (maximum value of in-MC LBA), it is reused by returning to the head. That is, the MC area is handled as a FIFO of ring buffer, and the data amount thereof is represented by a difference between the head in-MC LBA of the oldest data ($L_{mB}$ in the figure) and the last in-MC LBA of the newest data ($L_{mE}$ in the figure).

Note that, in actuality, movement of data to a data area may not be always performed to the oldest one, and for example, data 1 may be moved to the MC before data 0, but in that case, an apparent amount of use does not change.

Furthermore, increase of data amount of MC in the operation may cause a too much decrease in the empty area, and in that case, an empty area must be created in a command reception time, causing poor command responsivity, and thus, control to arbitrarily move data to a data area such that the data amount of MC does not become too much will be performed. This will be referred to as MC flash processing. Write to the data area can be performed per band unit alone, and thus, data which are not updated in already-existing data in the movement target band is rewritten by the same data. For example, if the flash destination of data M in the MC is block C of a band with blocks A, B, C, D, and E, data A, B, M, D, and E are sequentially written to the flash destination band. Data A, B, D, and E are prepared by reading original data before write. A media cache flash processing related to the update process of data A, B, M, D, and E will be described later with reference to FIG. 10.

The explanation of the band write in the SMR method is as above, and there is a performance improvement method with respect to the SMR method which is bypass write (hereinafter, may be referred to as BPW). The bypass write is a general method, and thus, explanation thereof will be omitted; however, note that it is a process to write data received from the host system 20 directly into a band in the data area without passing through the MC used in the conventional SMR method.

Figure 7:
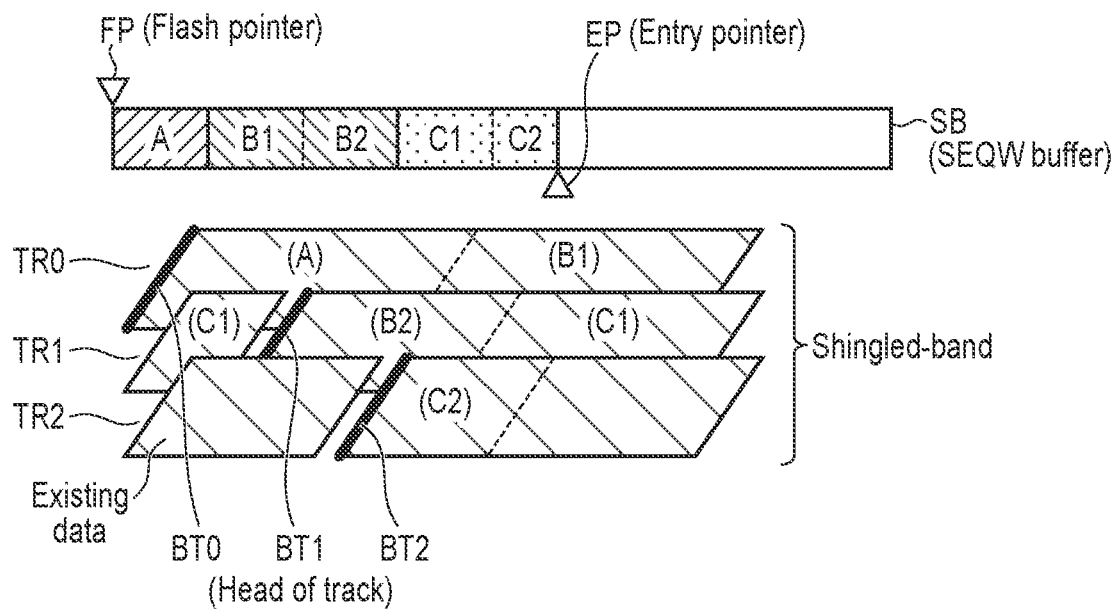
FIG. 7 is a first schematic view illustrating an example of a data write process to a magnetic disk in the magnetic disk device of the first embodiment.

FIG. 7 is a first schematic view illustrating an example of a data write process to the magnetic disk in the magnetic disk device of the first embodiment, indicating a previous state where bypass write to one shingle band is performed.

A sequential write buffer SB (or may be referred to as SEQW buffer) is a part of a DRAM area (buffer RAM 11) secured as a sequential write specific area for shingle bands, and is used to temporarily store the write data from the host system 20. The SEQW buffer area is used as a ring buffer, and includes an entry pointer (EP) indicating a head of received data and a flash pointer (FP) indicating a head of data written in the shingle band. For example, the figure indicates that data are received in the order of A, B1, B2, C1, and C2. Furthermore, the figure indicates an example where three write commands A, B, and C are received in this order, and the data are stored in the SEQW buffer.

The flash point FP does not pass the entry pointer EP, and data between the aforementioned pointers (A, B1, B2, C1, and C2 in the figure) are not yet written to the band, and thus, if there is an unexpected power cut, the data are stored in the flash ROM 14 by the PLP function.

In the figure, the shingle band includes three tracks (TR0, TR1, and TR2), and each track is represented as a flat surface, in which the end and the head thereof is continuous. BT0, BT1, and BT2 (or BT if specific identification is not necessary) each indicate a head position of data write in the tracks TR0, TR1, and TR2. Furthermore, the head position BT of each track is shifted in the forward direction because of track skew (positional shifting) as the track number increases. That is, the head position BT shifts forward in the order of TR0, TR1, and TR2. Note that, in the example depicted, data of one-forward track is erased by the band write.

Data B and C stored in the SEQW buffer are write target data by the write commands B and C, and are indicated as B1 and B2 and C1 and C2 based on the write target tracks thereof. Data A and B1 will be written to track TR0, data B2 and C1 will be written to track TR1, and data C2 will be written to track TR2.

Figure 8:
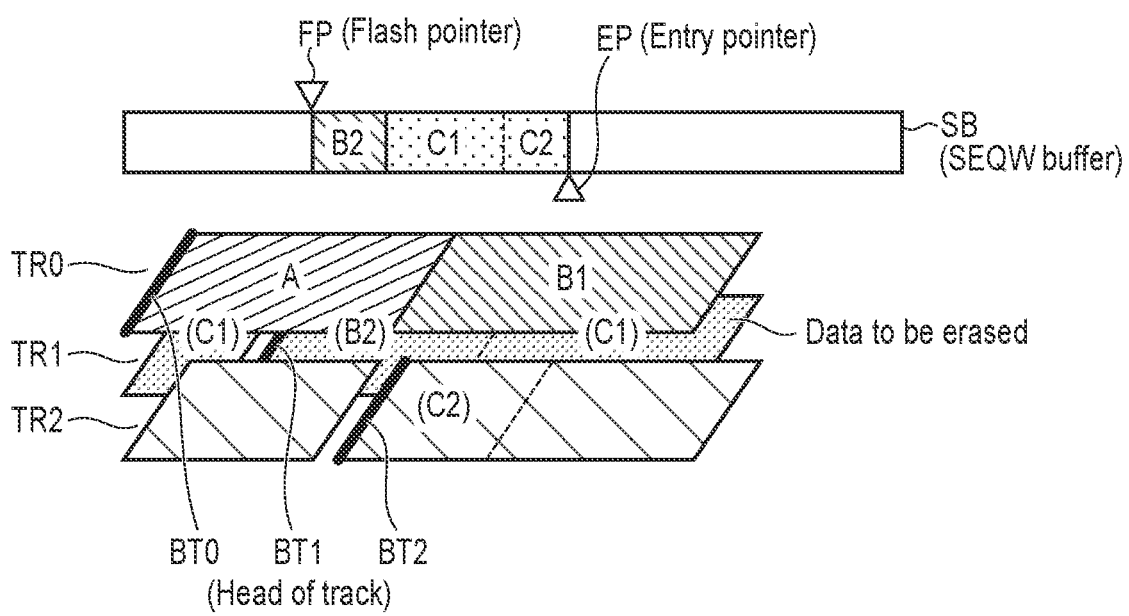
FIG. 8 is a second schematic view illustrating an example of the data write process to the magnetic disk in the magnetic disk device of the first embodiment.

FIG. 8 is a second schematic view illustrating an example of the data write process to the magnetic disk in the magnetic disk device of the first embodiment, indicating an after state where the write to track TR0 is performed.

In the state of FIG. 7, data of two tracks of tracks TR0 and TR1 are in the SEQW buffer, and thus, the write to the track TR0 is possible. The write of data A and B1 to track TR0 deletes all data in the track TR1 by shingle write, and data to be written to the track TR1 are already in the SEQW buffer. If an unexpected power cut occurs in the state of FIG. 8, data B2, C1, and C2 are stored in a nonvolatile memory, and thus, data loss does not occur.

FIG. 9 is a third schematic view illustrating an example of the data write process to the magnetic disk of the magnetic disk device of the first embodiment, indicating a state where bypass write to one shingled band is completed.

Write of data B2 and C1 of track TR1 is possible, as with the case of data A and B1 of track TR0 of FIG. 8, when receipt of C2 and D1 to be written to the forward track TR2 is completed. Furthermore, with respect to the track TR2 which is the last track in the band, there is no forward track requiring data protection, and thus, write of C2 and D1 can be performed continuously to the write of B2 and C1.

Data D2 indicate data assigned to a next shingled band, and include continuous data, and are written to the next shingled band in a similar method.

In the aforementioned example, the bypass write starts from the head of the band (head of track TR0); however, the bypass write may be started from the middle of a band (for example, head or middle of track TR1) in a similar manner.

Furthermore, when the bypass write ends in the aforementioned example, for example, if only the data A and B are received and sequential data thereof (data C and D) are not received, data already existing in tracks TR1 and TR2 are read sequentially to be stored in the SEQW buffer, and write is performed to the end of the band in a similar band write manner.

FIG. 10 is a fourth schematic view illustrating the data write process to the magnetic disk in the magnetic disk device of the first embodiment, indicating a state where an MC flash process with respect to one shingled band is being executed. In this example, a part of data of the shingled band is replaced with data Bm on MC.

In the example depicted, data to be written to tracks TR0 and TR1 are prepared from existing data A, B1, and B3 on the track and data Bm read from MC and stored in the SEQW buffer. Thus, as in the example of FIG. 8, write to track TR0 is performable. Then, data of track TR2 are read to be stored in the SEQW buffer, and data of tracks TR1 and TR2 are written sequentially to complete the flash operation of MC.

Furthermore, the process of FIG. 10 is performed without replacing the media cache data, it is a rewrite operation of the band. In the band of SMR, when write to bands adjacent thereto is repeated, data of tracks close thereto deteriorates, and thus, rewrite of data in such bands may be required. This is referred to as adjacent track interference (ATI) refresh which is widely adopted, and is essential in magnetic disk devices of recent years. The ATI refresh can be performed in the method of the present embodiment.

Figure 11:
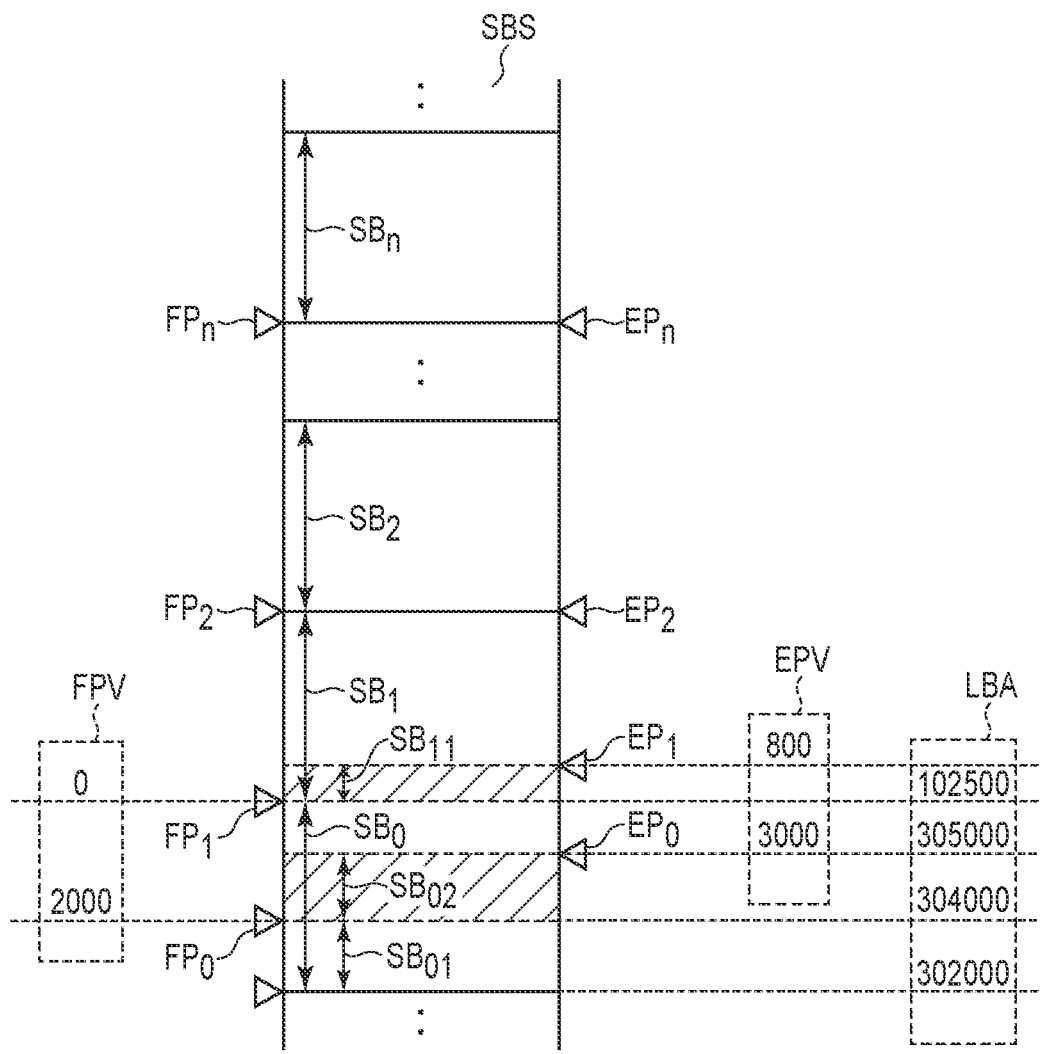
FIG. 11 is a schematic view illustrating an example of buffer for a bypass write process of the magnetic disk device of the first embodiment.

FIG. 11 is a schematic view illustrating an example of buffer of the bypass write process of the magnetic disk device of the first embodiment, indicating an example of a state of the SEQW buffer during a plurality of bypass write processes.

If the bypass write (BPW) is used, the magnetic disk device 1 directly writes the data received from the host system 20 to the bands in the user area without passing through MC. In the band, write can be performed only in the overwriting order (write direction of FIG. 4), and the bypass write can be performed only when it is sequential write in the write destination band. Thus, in the present embodiment, the magnetic disk device 1 detects a write command group from the host system 20, commands of which are to be sequential write, and writes the group to the band through the bypass write. With regard to commands which are not expected to be sequential write, a write process through the MC as in FIG. 10 will be applied.

Furthermore, multiple bypass writes can be performed at the same time. For example, if multiple sequential write command groups each with 100 blocks are received such as in LBA=10000, 20000, 10100, 20100, 10200, and 20200, two command streams of a sequential write command group of LBA=10000, 10100, and 10200 and LBA=20000, 20100, and 20200 are received simultaneously in a time division manner. If such multiple command groups are received, the magnetic disk device 1 of the present embodiment processes both command groups through the bypass write simultaneously. In the example of FIG. 11, n+1 (n is a natural integer) bypass writes are performed simultaneously.

The bypass write buffer is a part of the buffer RAM 11, and in which several pairs of SEQW buffers, entry pointers, and flash pointers are arranged. Thus, the magnetic disk device 1 can perform multiple bypass writes in parallel.

In this figure, $SB_0$, $SB_1$, $SB_2$, $SB_n$, and $EP_0$, $EP_1$, $EP_2$, $EP_n$, and $FP_0$, $FP_1$, $FP_2$, and $FP_n$ are, respectively, 0th, 1th, 2nd, and nth SEQW buffer, entry pointer, and flash pointer. In the example depicted, n+1 pairs of SEQW buffers, entry pointers, and flash pointers are arranged, and they may be dynamically secured if necessary.

FIG. 12 illustrates an example of a management table of the bypass write process of the magnetic disk device of the first embodiment, indicating a bypass write detection table in (a), and a bypass write execution table in (b).

The bypass write detection table of FIG. 12(a) is to detect sequential write which may be a target of the bypass write by monitoring of the write command received from the host system 20, and for example, may be stored in the system area of the magnetic disk DK, flash ROM 14, and the like. The bypass write detection table includes data elements such as Time indicative of a command reception time, NextLBA (NLBA) indicative of a head LBA next write command of which may be sequential write, Blocks indicative of accumulated block numbers of sequential write, and BP indicative of link information to the bypass write execution table, and indicates data elements per column.

For example, upon receipt of write command A designating 100 blocks from LBA=1000 while there is no entry in the bypass write detection table, the CPU 15 prepares a new entry, and NextLBA=1100 (1000+100), and Blocks=100.

Given that write command B designating 200 blocks is received from LBA=1100 after the write command A, and the CPU 15 here acknowledges NextLBA calculated at reception of the write command A and LBA of the write command B, which are both 1100. Thus, the write command B is determined to be the sequential command to the write command A. The CPU 15 updates the entry with respect to the write command A using the information of the write command B, where NextLBA=1300 (1100+200) and Blocks=300.

The CPU 15 monitors all write commands as above, and detects the sequential write command continuous for a certain period. Note that, the number of entries which can be stored in the bypass write detection table may be limited, and thus, an entry with low priority must be deleted for a new command. The CPU 15 selects, based on a predetermined setting such as lowest accumulated sequential block numbers within 10 oldest entries, a delete candidate entry using values of items (for example, Time and Blocks).

The CPU 15 monitors write commands, and if a sequential write command is continuous for a certain period, determines that the sequential write still continues, and performs the bypass write with respect to a write range of the sequential write command received next.

The bypass write execution table of FIG. 12(b) is data used to manage the bypass write being executed. The bypass write execution table includes data elements such as an entry number BP, Beginning LBA (BLBA) indicative of LBA starting the bypass write, EP indicative of a current entry pointer, FP indicative of a current flash pointer, and indicates data elements per column. The CPU 15 manages the bypass write by each element. EP and FP are both accumulative block numbers, and are not reset to 0 by a wrap operation within SB.

When starting the bypass write, the CPU 15 initially performs an entry addition process to the bypass write execution table. In the entry addition process, one of the empty entries is selected, and the entry number thereof is set to BP of the bypass write detection table. Then, as the initialization process of the entry, the CPU 15 sets LBA starting the bypass write to Beginning LBA, and 0 to EP and FP, and executes the bypass write.

Thereafter, upon receipt of the write data from the host system 20, the CPU 15 increases EP by the received block numbers, writes the data in a target band in the user data area 303 of the disk DK, and increases FP by the write block numbers. Control of the write using EP and FP is performed in a similar method as in FIGS. 7, 8, and 9. That is, when data amount of which is more than filling a forward one track of a track A accumulates in the SEQW buffer, write to the track A is performed. The CPU 15 manages the write process to the track based on values of FP and EP.

FIGS. 11 and 12 indicate an example in which the number of blocks per track is 1000, and the bypass write starts when the sequential write of 2000 blocks or more is performed.

Hereinafter, the process of the magnetic disk device 1 will be explained using BP=0 entry (entry 0), and BP=1 entry (entry 1).

Referring to the bypass write execution table of FIG. 12(*b*), the CPU 15 executes the bypass write with respect to data of entry 0 with LBA=302000 as the head, and the bypass write with respect to data of entry 1 with LBA=102500 as the head.

The write of sequential data to the disk DK from LBA=300000 to LBA=302000 is not the bypass write yet. Thus, the data are written to MC via an ordinary buffer (which is not SEQW buffer).

The CPU 15 acknowledges that the condition to start the bypass write is satisfied when the block number of the received sequential write reaches 2000 (LBA=301999), and then, registers entry 0 of the bypass write execution table (corresponding to TDE 0 of FIG. 12(*b*)), and starts the bypass write. Thus, bypass write starting LBA (BLBA) is 302000.

Data of 3000 blocks from LBA 302000 (three tracks) are received by $SB_0$, as depicted in the FIG. 11. Area $SB_{01}$ indicates that data of 2000 blocks write of which to the magnetic disk DK has been already completed were stored in past, and area $SB_{02}$ indicates that unwritten data of 1000 blocks are currently stored. This means that, at the time of receipt of data of 3000 blocks, the CPU 15 executes the write of 2000 blocks except for the last one track (blocks of LBA=302000 to 303999) to the magnetic disk DK by the bypass write.

Furthermore, the CPU 15 performs update of the bypass write detection table during execution of the bypass write, and thus, for example, at the time when receiving data of 3000 blocks of area $SB_{01}$ and area $SB_{02}$, the CPU 15 sets, with respect to entry 0 of the bypass write detection table, Blocks to 5000 (2000+3000) and NextLBA to 305000 (30000+5000) (corresponding to TDD0 of FIG. 12(*a*)).

Figure 13:
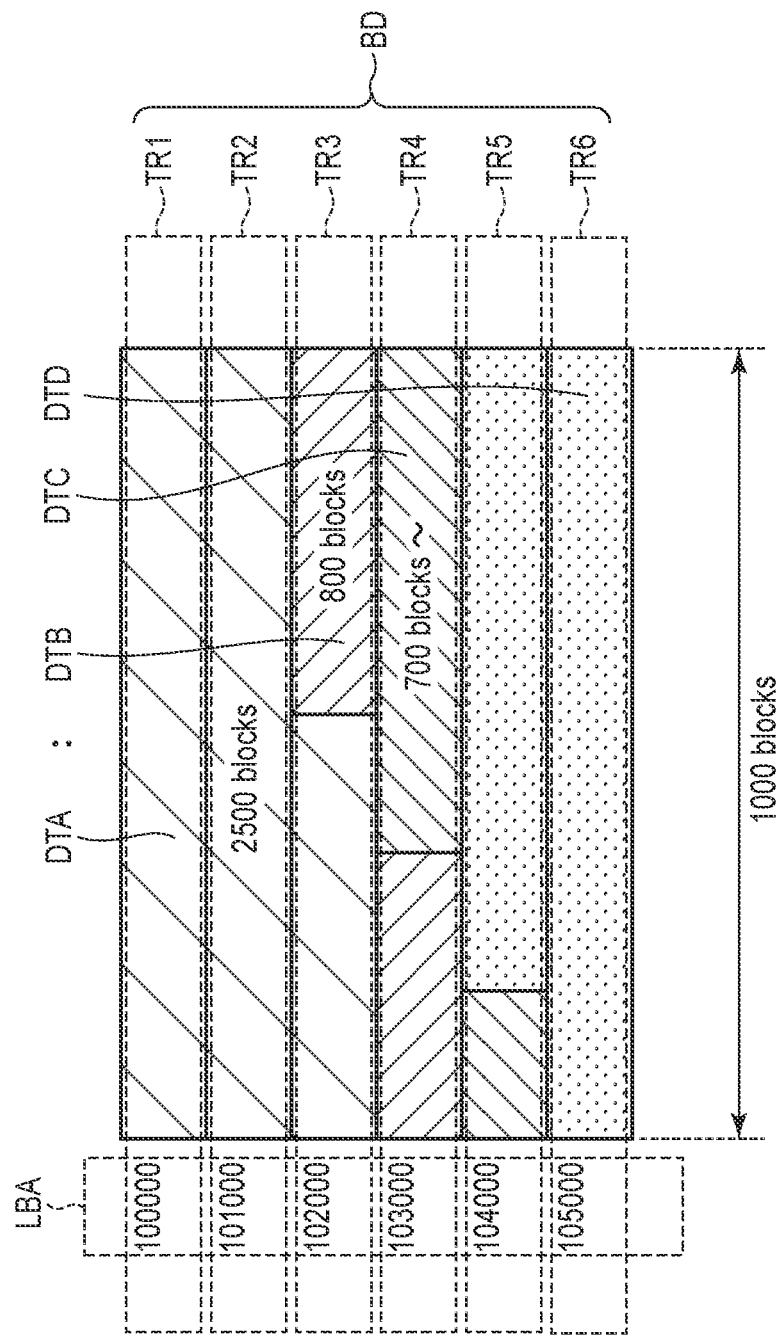
FIG. 13 is a schematic view illustrating an example of data written in a track in the bypass write process of the magnetic disk device of the first embodiment.

FIG. 13 is a schematic view illustrating an example of data written to a track in the bypass write process of the magnetic disk device of the first embodiment, indicating an example of a state of the band BD on the magnetic disk DK.

The band BD includes six tracks of TR1 to TR6. The six tracks include 1000 blocks with heads of LBA=100000, 101000, 102000, 103000, 104000, and 105000, respectively.

Data DTA indicate data of 2500 blocks from the head LBA=100000 of TR1 written by write command A. Since the bypass write start condition (sequential write of 2000 blocks or more) is satisfied while writing data DTA, the CPU 15 performs bypass write of data DTB of write command B following data DTA. Upon receipt of data DTB, the CPU 15 starts the bypass write with LBA=102500 which is next to the last LBA of data DTA. Note that, data DTA on the figure represents a hypothetical position on the band, and data DTA are written to MC in actuality. Furthermore, in this figure, track skew is 0 for the sake of simplification.

In this example, the bypass write does not start from LBA=102000 and it is because determination of the start condition is performed per command, and a target of the bypass write is data DTB or data thereafter designated by write command B. Here, for example, the process of write command may be divided into two, and when the bypass write start condition (sequential write of 2000 blocks or more) is satisfied, the bypass write may be performed for the latter 500 blocks of data DTA (blocks of LBA=102000 to 102499 of TR3). In the bypass write process, data DTB of 800 blocks to be written to TR3 are received after the start, but data to be written to forward track TR4 are not, and thus, write to TR3 cannot be performed yet.

The condition to allow the write to the track is that all data to be written to the forward track are set, and in this case, the number of blocks per track is 1000, and thus, write of 500 blocks from LBA=102500 of TR3 becomes possible when receiving data DTC of 700 blocks or more to be written to forward track TR4.

Data of tracks thereafter are written when data of their forward one track are set by receiving sequential data, as in the processes shown in FIGS. 7 and 8.

When ending the bypass write, the CPU 15 reads existing data in the band with EP as the head instead of receiving data from the host system 20. For example, in the example of FIG. 13, if data DTD are not received after receipt of data DTC, the CPU 15 determines that the bypass write process ends. In that case, the CPU 15 reads the existing data related to data DTD from the band, and starts write to SB of corresponding entry from the position of EP. Thus, data update can be performed in a manner similar to the bypass write. Note that, if data DTD start from the last track in the band, there is no data to be destroyed in the forward position, and thus, this process is not necessary.

When the bypass write is ended, the CPU 15 deletes the ended entry from the bypass write detection table and the bypass write execution table. The bypass write execution table is not required to be rearranged because the entry numbers are associated with SB while the bypass write detection table is rearranged with respect to the data for better process efficiency if necessary. For example, LBAs are rearranged in an ascending order, or chain information for order management may be added to Time, LBA, and Blocks without performing physical rearrangement.

Hereinafter, an example of a process of data storage by the PLP function in the magnetic disk device 1 will be explained.

Effective data in the bypass write detection table, bypass write execution table, and SB (hereinafter, the three data will be referred to as bypass write related data) must be constantly maintained even in a power loss occasion and the like. Ordinarily, the data are arbitrarily written in a specific area in the system area 301 on the magnetic disk DK. In general, in a proper procedure in a power loss occasion of magnetic disk devices, a command to perform write of unsaved data such as Standby or Flush Cache is executed, and the power is cut after the completion of the command. Through such a procedure, the bypass write related data are stored in the specific area as a part of unwritten data.

However, in actuality, a power cut may occur without such a proper procedure as in a power loss during the operation, and in such a case, data loss must be prevented. In the magnetic disk device 1 of the present embodiment, unwritten data in write buffer and bypass write related data are stored in the buffer RAM 11 with which the PLP function is effective. As long as the magnetic disk DK rotates at a constant rate, in a power loss occasion, the HDC 10 of the magnetic disk device 1 can write unsaved data on the buffer RAM 11 such as the unwritten data in the write buffer and the bypass write related data to the flash ROM 14 using the rotation energy of the magnetic disk DK by the PLP function.

FIG. 14 is a schematic view illustrating an example of the data protection process by the PLP function of the magnetic disk device of the first embodiment, indicating an example of a state of the buffer RAM 11 including the SEQW buffer during a plurality of bypass write processes.

The buffer RAM 11 includes the bypass write detection table, bypass write execution table, and effective data of one or more entries such as effective data of $SB_0$, ..., $SB_n$ (n is a natural integer).

Upon occurrence of power loss, the magnetic disk device 1 writes the bypass write detection table, bypass write execution table, effective data of $SB_0$, and effective data of $SB_1$ to $SB_n$ in the specific area of the flash ROM 14 in this order by the PLP function. The data to the flash ROM 14 must be all sequential per entry (for example, from $SB_0$ to per $SB_n$ in ascending order of n), and thus, a pointer jump function of the buffer RAM 11 may be activated to connect such scattering data.

The pointer jump function is a hardware function to enable sequential access with respect to non-sequential data by designating a pair of addresses in the buffer RAM 11 (for example, A and B). The pair of address is designated by the CPU 15 when the firmware is executed. In an ordinary sequential access, when data of address k on the buffer RAM 11 is accessed, data of next address k+1 is accessed then. However, when an address designated by the pointer jump function (for example, aforementioned A) is accessed, the counterpart thereof (for example, aforementioned B) is accessed then.

In this example, as in FIG. 14, $TP_E$ and $FP_0$, $EP_0$ and $FP_1$, and $EP_{n-1}$ and $FP_n$ are paired with pointer jumps $PJ_0$, $PJ_1$, and $PJ_n$, respectively, and thus, the effective data of the bypass write detection table, bypass write execution table, and SB can be sequentially written to the flash ROM 14 of FIG. 14. The flash ROM 14 stores bypass write detection table $MD_0$, bypass write execution table $MD_1$, data $FD_0$ of $EP_0$ to $FP_0$, data $FD_1$ of $EP_1$ to $FP_1$, and data $FD_n$ of $EP_n$ to $FP_n$.

Furthermore, as in the buffer RAM 11 of FIG. 14, if the bypass write detection table, bypass write execution table, and $SB_0$ to $SB_n$ are arranged sequentially, they may all be stored without using the pointer jump function although the efficiency may be decreased since ineffective data in SB are stored.

As above, the data written to the flash ROM 14 in a power loss occasion are read in a next booting time of the magnetic disk device 1, remapped in the original positions in the buffer RAM 11, and descriptively stored in the specific area in the system area 301. After the completion of the above process, the data stored in the flash ROM 14 are invalidated.

The magnetic disk device 1 of the present embodiment uses the PLP function to gain not only the backup effect of unwritten data in a power loss, but also overwrite of data in the shingled-recording area, enabling the bypass write without using an empty band. Hereinafter, an operation example of the bypass write process of the magnetic disk device 1 is shown.

Figure 15:
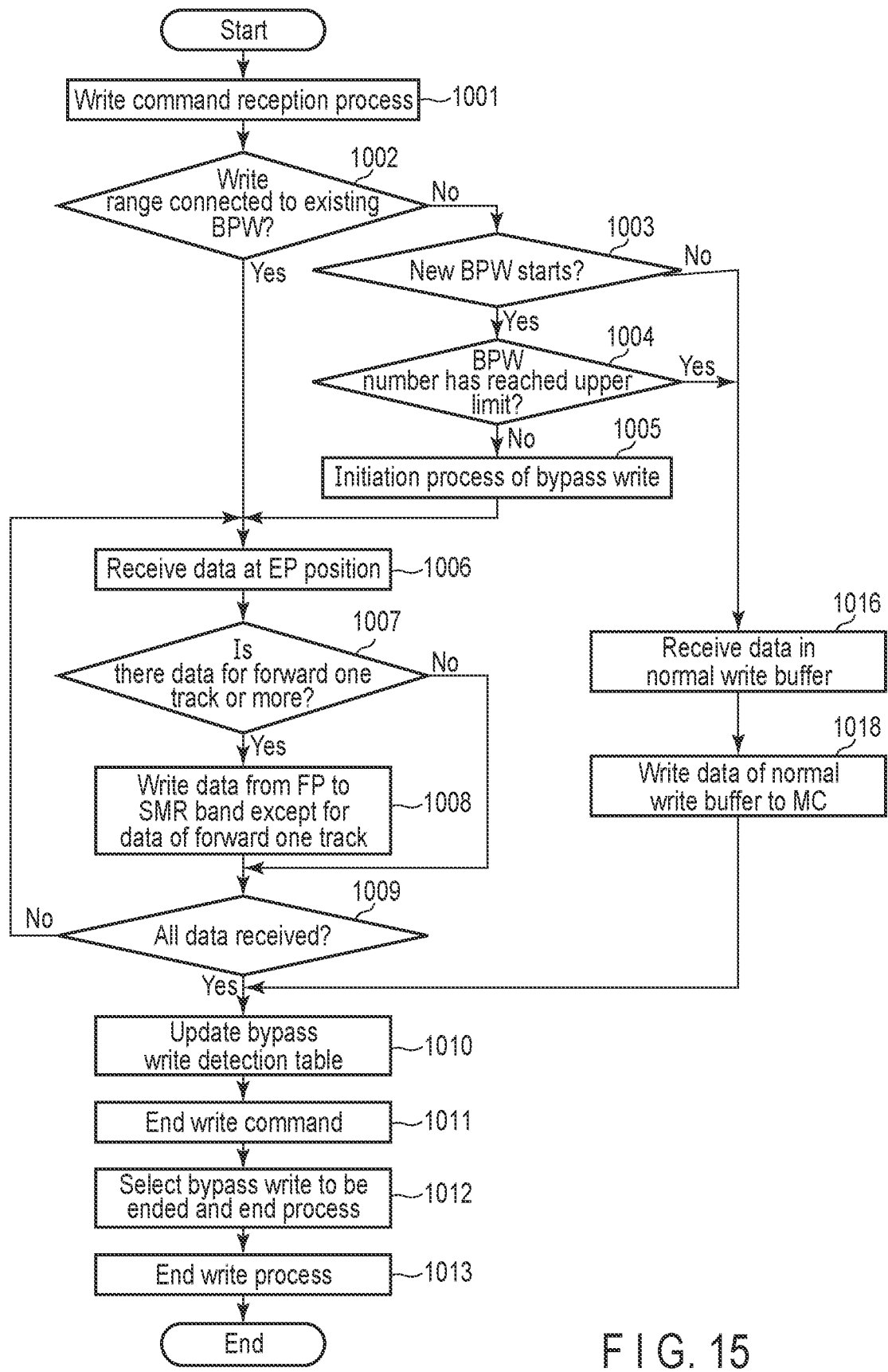
FIG. 15 is a flowchart illustrating an operation example of the bypass write process of the magnetic disk device of the first embodiment.

FIG. 15 is a flowchart illustrating an operation example of the bypass write process of the magnetic disk device of the first embodiment.

In the magnetic disk device 1, upon receipt of a write command from the host system 20, the CPU 15 starts the process of write command (step 1001). At this point, write data are not received.

The CPU 15 initially checks if a write range of the received write command is executable as a sequential write to the bypass write currently being executed, or if the write range is connected to the existing bypass write (step 1002). In step 1002, the CPU 15 retrieves the bypass write detection table, and if there is an entry with NextLBA as the same with that of the head LBA of the write command is in the same table, and the value of BP is effective (having link information), the CPU 15 processes the received write command as a sequential write to the bypass write of the entry (Yes in step 1002).

If the received write command is not executed as a continuation of a bypass write (No in step 1002), the CPU 15 determines whether or not a new bypass write is started with the write command (step 1003). In step 1003, the CPU 15 retrieves the bypass write detection table, and checks if the entry with NextLBA of the same value as the head LBA of the received write command is in the table. If there is such an entry, the CPU 15 determines that the received command is related to the existing sequential write, and the value of Blocks of the entry is checked. The value is the accumulative block number of the sequential write, and thus, the CPU 15 determines that the condition to start a new bypass write is satisfied if the value is a determined value (2000 blocks in this example) or more (Yes in step 1003), and checks if the bypass write execution table has an empty entry, that is, whether or not the upper limit of the bypass write execution number is reached (step 1004).

If there is an empty entry in the bypass write execution table (the upper limit of the bypass write execution number is not reached) (No in step 1004), the CPU 15 performs the bypass write start process (step 1005). In step 1005, the initialization process is performed. Specifically, the CPU 15 sets head LBA, EP, and FP to the empty entry, and sets BP to the entry of the bypass write detection table.

If the bypass write is newly started in the aforementioned procedure (step 1005), or if the current write command is connected to the existing bypass write (Yes in step 1002), for performing the bypass write, the CPU 15 receives the data from the host system 20, and writes the data to the area with the head which is pointed by EP set to the entry on the buffer RAM 11 (step 1006). In step 1006, the maximum amount of the received data is the unused space of the target SB of the entry, and if the request block number of the write command (write data amount) is greater than that, the maximum receivable amount is received.

As a result, if there is acknowledged, in the target band, data of forward one track (TR1) of the write target track (TR0) of the data at the FP position, (Yes in step 1007), the CPU 15 acquires the data to write from the block indicated by FP to the last of track TR0 from the buffer RAM 11, and writes the data to the target track of the magnetic disk DK (step 1008). Furthermore, if there is acknowledged data of multiple tracks (TR1 and TR2) forward of the write target track TR0 (Yes in step 1007), the CPU 15 acquires all data from the buffer RAM 11 except for the data of one track TR2 in the most forward, and writes the data to the target track of the magnetic disk DK (step 1008). On the other hand, if there is acknowledged no data to the last of TR1 (No in step 1007), the CPU 15 proceeds to step 1009 without performing the write process of step 1008.

After the data write is completed in step 1008, the CPU 15 acknowledges whether or not all request data of write command are received (step 1009). In step 1009, if acknowledged that all request data of write command are received (Yes in step 1009), the CPU 15 updates the bypass write detection table (step 1010), and performs the end process of command (step 1011). On the other hand, if data to be received are remaining (No in step 1009), the CPU 15 returns to step 1006 to repeat the process.

Furthermore, in step 1003, if the received write command does not satisfy the start condition of the bypass write (No in step 1003), or the execution number of the bypass write has already reached to the upper limit (Yes in step 1004), the CPU 15 performs an ordinary write process without performing the bypass write. Specifically, the CPU 15 receives data in an ordinary write buffer (not shown) (step 1016), and writes the data in MC (step 1018).

After the write process of steps 1006 to 1009, or steps 1016 to 1018, the CPU 15 performs an update process of the bypass write detection table (step 1010). In step 1010, if there is an entry with NextLBA which is the same as the head LBA of the currently executed command, the CPU 15 adds the block number of the currently executed command to the NextLBA and Blocks of the entry.

On the other hand, in step 1010, if there is no same entry as with the head LBA of the currently executed command, the CPU 15 newly registers the current command information to one of the empty entries. In that case, (head LBA of command+block number) is set to NextLBA, and block number to Blocks. If there is no empty entry, an empty entry is prepared by selecting one entry from the existing entries to which the bypass write is not currently executed (there is no link information to BP of the bypass write detection table) such as an oldest one, or one with least accumulated block number, and erasing information therein.

After the aforementioned process, the CPU 15 ends the write command (step 1011), and then, performs, if necessary, an end process of the existing bypass write as a background process (step 1012). In step 1012, if the end process is necessary, and if it is, which entry is deleted will be determined based on the table information. For example, the necessity of deletion may be determined based on the number of the currently-executed bypass writes, or a target for the end process may be selected by retrieving entries to which the bypass write is currently-executed (link information with BP) in the bypass write detection table, and choosing one with old Time or least accumulation write number, or satisfying both.

In step 1012, the number of bypass writes for the end process may be one, or may be several. The end process is performed as explained above. Note that, the process is performed after the command in the background in order to suppress an influence to a command responsivity by bypass end processes which takes a processing time.

When the bypass write end process (including determination thereof) by the CPU 15 ends, the entire write process ends (step 1013).

In the bypass write method, generally, overwrite of the data in the write target band is not performed for the data protection in a power cut occasion of the magnetic disk device, and an empty band is generated in a different position to write the data therein.

However, the empty band is prepared by writing all data of LBAs assigned to the band to the media cache, and thus, an access time increases thereby, and media cache is used. Specifically, when multiple bypass writes (multi-streaming writes) are performed at the same time in such as a surveillance camera model, empty bands must be prepared for the number of bypass writes, which causes a decent influence.

The magnetic disk device 1 of the present embodiment uses the PLP function, and achieves not only the effect of backup (data protection) of unwritten data in the buffer RAM 11 by the PLP function in a power loss occasion, and also the bypass write which can perform the overwrite of the data in the shingled-recording area without using an empty band.

Note that, in the above process, the end process of the bypass write directly related to the write command execution is performed in the background. The CPU 15 may execute, for example, the MC flash process of FIG. 10 and ATI refresh process in the background after ending the command (not limited to write command) in step 1013.

The present embodiment is based on an idea that, when write is performed to a track by shingled-recording (band write), data in forward one track is destroyed at the same time; however, for example, if data of forward two tracks or more are destroyed, such a process is performable in the same process as above.

For example, if the forward m tracks of a target track are destroyed in the shingled-recording write, the write execution is held until the data written to mth track are received in SB. In order to perform this in the example of FIG. 15, the process in step 1007 should be changed to "Is there data for forward m tracks or more?", and the process in step 1008 should be "Write data from FP to SMR band except for data of forward m tracks."

Second Embodiment

A magnetic disk device of the present embodiment sets track skew of an overlapping track the same as with that of a forward track. Thus, a data amount stored in SEQW buffer can be reduced.

In the first embodiment, because of the track skew as in FIG. 7 (positional shifting of track heads BT0, BT1, and BT2), when performing a write to the head of track 0, for example, data near the end of track TR1 (corresponding to data C1 on TR1 of FIG. 7) are erased. Thus, in the first embodiment, all data of track TR1 must be received before performing the write to track TR0. Thus, the magnetic disk device of the present embodiment adjusts the skew of tracks between TR0 and TR1, so that the BT0 and BT1 are aligned.

Figure 16:
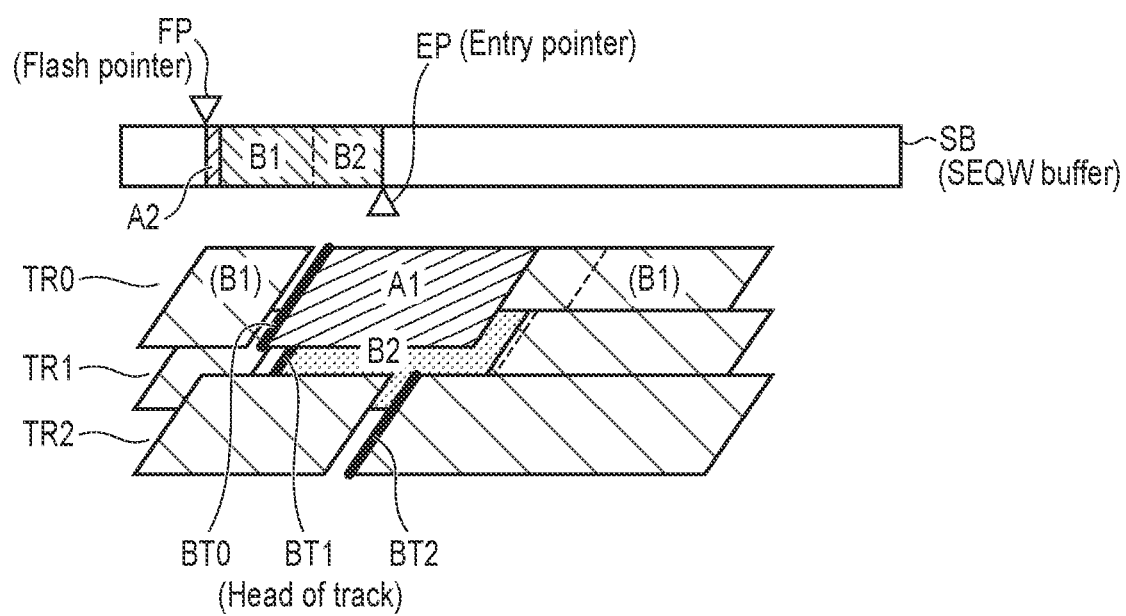
FIG. 16 is a schematic view illustrating an example of a data write process to a magnetic disk in a magnetic disk device of a second embodiment.

FIG. 16 is a schematic view illustrating an example of the data write process to the magnetic disk of the magnetic disk device of the second embodiment.

By adjusting the track skews of track TR0 and track TR1 of the magnetic disk DK, the head of track TR1 is erased when writing the head of track TR0. For example, when writing track TR0, it is written such that the head BT0 of track TR0 and the head BT1 of track TR1 are aligned. Thereafter, repeatedly, when writing to track TRn, the head of the track thereof is aligned to that of track TR (n+1).

Through the above process, data to be held on the SEQW buffer can be decreased to one track data. Furthermore, the write of the first embodiment must be performed per track while the write of the present embodiment can be performed to the middle of a track based on the received data amount, and thus, streaming write using room logic is performable.

The implementation of the present embodiment are the same as those of the first embodiment including table, flowcharts, and the like; however, not the following points.

(1) Data held in SEQW buffer are data of one track. For example, a condition of determination of step 1007 of the flowchart of FIG. 15 is changed to achieve this point.

(2) Bypass write is always performed from the head of bands. For example, a condition of determination is added before step 1005 of FIG. 15, and it proceeds to step 1016 if the write command of the present embodiment does not overlap the head of the band. Furthermore, in step 1005, data to the head of the band are received from the host system 20, and are written to MC.

(3) Table including initial values of skews of each band (skew values of band head tracks) is included.

A table including initial skew values of each band is prepared, and the CPU 15 refers to the table in the execution of step 1008 to acquire the skew value of each track in the bands. When finishing the write of one band, the CPU 15 updates the skew value of the band. The table is arranged to be adjacent to the bypass write detection table and the bypass write execution table, and read/write from/to the system area 301, and protection process by PLP are performed at the same time with the aforementioned two tables.

Through the above process, the magnetic disk device of the present embodiment can reduce the data amount stored in the SEQW buffer.

The aforementioned magnetic disk device 1 may include one or more optional combinations of the following characteristics.

(A-1) The magnetic disk device of the embodiment performs a sequential write to a shingled-recording area from a head of the area or from a middle of the area, and therein, the device includes means of performing a write to a first track of write target after receiving all of first data (for example, data A and B1 of FIG. 8) to be written to a first track of write target (TR0 of FIG. 8), and second data (for example data B2, C1, and C2 of FIG. 8) disposed in a second track (for example TR1 of FIG. 8) which is one-forward track of the first track, which overwrites data to be erased by the writing to the first track, on a volatile memory (for example, buffer RAM11 of FIG. 14), and means of storing data which are not written to the shingled-recording area (for example data B2, C1, and C2 of FIG. 8) of the data received in the volatile memory to a nonvolatile memory (for example, flash ROM 14 of FIG. 14) in an unexpected power cut occasion.

(A-2) The magnetic disk device of aforementioned (A-1) adds, in an unexpected power cut occasion, management information (for example data $MD_0$ and $MD_1$ of FIG. 14) to data which are not written in the shingled-recording area (for example, data $FD_0$, $FD_1$, and $FD_n$ of FIG. 14) of the data received on the volatile memory (for example, buffer RAM 11 of FIG. 14), and stores the data in the nonvolatile memory (for example, flash ROM 14 of FIG. 14).

(A-3) The magnetic disk device of aforementioned (A-1) writes, in an unexpected power cut occasion, the data on the volatile memory (buffer RAM 11 of FIG. 14) to the nonvolatile memory (for example, flash ROM 14 of FIG. 14) using an electromotive force by the rotation energy of the magnetic disk.

(A-4) The magnetic disk device of aforementioned (A-1) performs the sequential write to the shingled-recording area which is a process of directly writing data received from a host to the shingled-recording area without passing a media cache (MC 302 of FIG. 3) (bypass write).

(A-5) The magnetic disk device of aforementioned (A-1) performs the sequential write to the shingled-recording area with data (for example SB of FIG. 10) of combination of original recording data and media cache data (flash process of media cache).

(A-6) The magnetic disk device of aforementioned (A-1) performs the sequential write to the shingled-recording area using the original recording data on the magnetic disk (ATI refresh process).

(A-7) The magnetic disk device of aforementioned (A-1) writes, if the write unit of the shingled-recording area is divided by certain track number, upon receipt of data of the last track (for example, TR2 of FIG. 10) in the write unit, all unwritten data (for example, D1 and C2 of FIG. 10) sequentially.

(A-8) The magnetic disk device of aforementioned (A-1) sets, if the write is performed from the head of the shingled-recording area, track skew of a write target track (for example, TR0 of FIG. 16) as with the same track skew of a forward track (for example, TR1 of FIG. 16).

(A-9) The magnetic disk device of aforementioned (A-1) to (A-8) performs the write to a write target track in the shingle area (for example, TR1 of FIG. 4), and if data to multiple forward tracks (for example, TR2 and 3 of FIG. 4) are erased, the device performs the write to the write target track after receiving all data of the multiple forward tracks.

With aforementioned (A-1), (A-2), and (A-3), in the execution of the sequential write to the shingled-recording area, the existing data in the shingled-recording area can be overwritten without losing the received data in an unexpected power loss occasion. Thus, generation of an empty band for the sequential write is not required, and the efficiency of the write process increases.

With aforementioned (A-4), by performing the bypass write through the method of aforementioned (A-1), increased command responsiveness is achieved in a case where multiple bypass writes are performed at the same time as in multi-stream writes.

With aforementioned (A-5), by performing the flash process of media cache through the method of aforementioned (A-1), no empty band is required, and thus, the efficiency of the process increases.

With aforementioned (A-6), the effect from the ATI refresh process is achieved.

With aforementioned (A-7), a last track of shingled-bands can be sequentially written from the backward track, and thus, a required time can be shortened.

With aforementioned (A-8), track skews are matched with forward track, and data amount to be held in a volatile area can be reduced, and thus, the number of sequential writes performed simultaneously in the method of (A-1) can be increased.

With aforementioned (A-9), even if multiple forward tracks are erased in a band write, the sequential write can be performed through aforementioned (A-1) to (A-8) except for (A-7), and thus, magnetic disk devices applicable to the method of the embodiment can be increased.

According to the aforementioned embodiments, a magnetic disk device which can perform bypass write without using an empty band, and a write method of the same can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Processing steps in the flowcharts and sequence charts, and the like described in the aforementioned embodiments are within the scope of the invention even if steps are exchanged, deleted, or added without departing from the spirit and scope of the invention.

Processings indicated in the flowcharts, sequence charts, and the like may be realized by hardware such as CPU, IC chip, digital signal processor (DSP), software operable in a computer including a microcomputer (program, for example), or a combination of hardware and software.

Furthermore, claims written as a processing logic, as a program including instructions executing in a computer, or as a computer-readable recording medium with the instruction are encompassed within the scope of the invention. Furthermore, terms used in the above are not limited, and other expressions which are understandable as substantially the same are encompassed within the scope of the invention.

What is claimed is:

1. A magnetic disk device configured to record data in a shingled-recording manner, wherein
the device performs sequential write in a shingled-recording area on a magnetic disk such that data to be written in a write target track and data to be located in a track that is one track forward the write target track are stored in a volatile memory and then write with respect to the write target track is performed, and
upon occurrence of an unexpected power cut, the device stores unwritten data, which is data that have not been written in the shingled-recording area out of data stored in the volatile memory, into a nonvolatile memory.

2. The magnetic disk device of claim 1, wherein, upon occurrence of the unexpected power cut, the unwritten data with information to manage the unwritten data.

3. The magnetic disk device of claim 1, wherein, upon occurrence of a power cut, the data on the volatile memory are written in the nonvolatile memory using an electromotive force from rotational energy of the magnetic disk.

4. The magnetic disk device of claim 1, wherein the sequential write with respect to the shingled-recording area is a write process of data received from a host directly to the shingled-recording area without passing through a media cache.

5. The magnetic disk device of claim 1, wherein the sequential write with respect to the shingled-recording area is performed with combination data including recording data on the magnetic disk and data of a media cache.

6. The magnetic disk device of claim 1, wherein the sequential write with respect to the shingled-recording area is performed by recording data on the magnetic disk.

7. The magnetic disk device of claim 1, wherein, if a write unit of the shingled-recording area is divided at a certain track number, upon receipt of data of a last track of the write unit, data unwritten are all sequentially written in the shingled-recording area.

8. The magnetic disk device of claim 1, wherein, if write is started from a head of a write area of the shingled-recording, the write is performed with a track skew of a write target track which is the same as that of a forward track.

9. The magnetic disk device of claim 1, wherein, if data of a plurality of forward tracks are erased when performing write with respect to a write target track in the shingled-recording area, all data of the forward tracks are received on the volatile memory and then, the write to the write target track is performed.

10. A data write method of a magnetic disk device configured to record data in a shingled-recording manner, the method comprising:
performing sequential write with respect to a shingled-recording area on the magnetic disk such that data to be written in a write target track and data to be located in a track that is one track forward the write target track are stored in a volatile memory, and then the write with respect to the write target track is performed; and
storing unwritten data, which is data that have not been written in the shingled-recording area out of data stored in the volatile memory, into a nonvolatile memory upon occurrence of an unexpected power cut.

11. A magnetic disk device configured to record data in a shingled-recording manner, wherein
the device performs sequential write in a shingled-recording area on a magnetic disk such that data to be written in a write target track and data to be located in a track that is one track forward the write target track are stored in a volatile memory and then write with respect to the write target track is performed,
upon occurrence of an unexpected power cut, the device stores unwritten data, which is data that have not been written in the shingled-recording area out of data stored in the volatile memory, into a nonvolatile memory, and
if write is started from a head of a write area of the shingled-recording, the write is performed with a track skew of the write target track which is the same as that of a forward track.

12. A magnetic disk device configured to record data in a shingled-recording manner, wherein
the device performs sequential write in a shingled-recording area on a magnetic disk such that data to be written in a write target track and data to be located in a track that is one track forward the write target track are stored in a volatile memory and then write with respect to the write target track is performed,
upon occurrence of an unexpected power cut, the device stores unwritten data, which is data that have not been written in the shingled-recording area out of data stored in the volatile memory, into a nonvolatile memory, and
if data of a plurality of forward tracks are erased when performing write with respect to the write target track in the shingled-recording area, all data of the forward tracks are received on the volatile memory and then, the write to the write target track is performed.

* * * * *